United States Patent [19]

Mitsuda et al.

[11] 4,185,301
[45] Jan. 22, 1980

[54] SCANNING VELOCITY MODULATION SYSTEM

[75] Inventors: Katsumi Mitsuda, Hirakata; Katsuhiko Yamamoto, Neyagawa; Katsumi Adachi, Moriguchi; Susumu Tsujihara, Neyagawa; Taiichi Saeki, Katano; Minoru Takeda, Hirakata, all of Japan

[73] Assignee: Matsushita Electric Industrial Co., Ltd., Osaka, Japan

[21] Appl. No.: 910,872

[22] Filed: May 30, 1978

[30] Foreign Application Priority Data

Jun. 1, 1977 [JP] Japan .................................. 52-65008
Jun. 1, 1977 [JP] Japan .................................. 52-65009
Jun. 8, 1977 [JP] Japan ............................. 52-75066[U]

[51] Int. Cl.² .............................................. H04N 5/68
[52] U.S. Cl. .................................................. 358/242
[58] Field of Search ....................... 358/64, 65, 37, 166, 358/242; 315/391, 394, 395; 340/730, 736

[56] References Cited

U.S. PATENT DOCUMENTS

| 2,678,964 | 5/1954 | Loughlin | 358/166 |
| 2,798,114 | 7/1957 | Schlesinger | 358/64 |
| 3,830,958 | 8/1974 | Fuse et al. | 358/242 |
| 3,936,872 | 2/1976 | Miyaska | 358/242 |
| 3,980,819 | 9/1976 | Schwartz | 358/166 |
| 4,080,628 | 3/1978 | Jirka | 358/166 |

Primary Examiner—John C. Martin
Attorney, Agent, or Firm—Stevens, Davis, Miller & Mosher

[57] ABSTRACT

A system for compensating image contour by modulating a scanning velocity in accordance with a video signal is disclosed, in which a mean current dissipated in a driving power amplifier is detected to control a gain of an amplifier in a preceding stage for suppressing the increase of power dissipation in the power amplifier when a video signal having many noises is received. The preceding stage amplifier is provided with a saturation characteristic to enhance the effect of contour compensation at a small amplitude signal and eliminate over compensation of image contour at a large amplitude signal. The combination of the saturation characteristic and the gain control further enhances the effect of suppression of power dissipation.

7 Claims, 19 Drawing Figures

SCANNING VELOCITY MODULATION SYSTEM

The present invention relates to a contour compensation system in a television receiver for increasing the sharpness of reproduced image by changing a deflection speed of an electron beam of a cathode ray tube in accordance with a video signal.

As a means for compensating contour of television image, a method for changing a horizontal scanning velocity in accordance with a video signal has been known. The principle of that method is explained with reference to waveforms shown in FIG. 1. FIG. 1a shows a video signal waveform when a cathode or a grid of a cathode ray tube is driven by this signal, a brightness on a screen of the cathode ray tube changes in a manner as shown in FIG. 1b in which edge portions have been cut away, because of a definite extension of beam spot. In order to improve the brightness characteristic, contour compensating signal currents A and B which are derived by differentiating the video signal may be superimposed on a horizontal scanning current which changes linearly with respect to time as shown in FIG. 1c. Thus, since the screen brightness is inversely proportional to the scanning velocity, it is dark where the scanning velocity is high and bright where the scanning velocity is low. Consequently, a screen brightness having edge portions enhanced as shown in FIG. 1d is obtained.

This contour compensation system by the scanning velocity modulation is particularly effective in increasing the sharpness of a high brightness image, to compare with the system of applying the contour compensating signal to the cathode or grid, because an apparent spot size on the screen of the cathode ray tube can be reduced in horizontal direction.

FIG. 2 shows a block diagram of one example of the contour compensating system by the scanning velocity modulation. In FIG. 2, numeral 1 denotes an antenna, 2 denotes a tuner, 3 denotes a VIF amplifier/detector, 4 denotes a video signal amplifier, 5 denotes a horizontal deflection circuit, 6 denotes a vertical deflection circuit, 7 denotes a video signal output amplifier, 8 denotes a horizontal deflection coil, 9 denotes a vertical deflection coil and 10 denotes a cathode ray tube. The arrangement described above is exactly same as that of a conventional television receiver and hence the operation thereof is not explained here.

In FIG. 2, numeral 16 denotes a scanning velocity modulation circuit, an output signal from the video signal amplifier 4 is applied to an amplifier 11, an output of which is differentiated by a differentiation circuit 12, an output of which is amplified by an amplifier 13 and than power amplified by an output amplifier 14 which drives a velocity modulating compensation coil 15.

The amount of deflection of electron beam by the velocity modulating compensation coil 15 may be much smaller than the amount of main deflection, but since the deflection frequency thereof is in the same order as the video fequency (i.e., 2 MHz), an impedance of the compensation coil 15 is so high that a large amplitude drive voltage must be applied across the coil. As a result, a large output power is required for the output amplifier 14. A class-B push-pull type output circuit is therefore used to improve a power efficiency.

Now considering a current flowing in the compensation coil 15, when a video signal having a waveform as shown in FIG. 3a is received, a current having a differentiated waveform of the video signal, as shown in FIG. 3b, flows in the compensation coil 15. A magnetic field created by the current flowing in the compensation coil 15 and a magnetic field created by the horizontal deflection coil 8 are superimposed in the cathode ray tube to velocity-modulate the electron beam. As seen from the current waveform shown in FIG. 3b, since the current does not flow constantly, a mean current value thereof is relatively small.

However, when the video signal includes many high frequency components which lead to the reduction of S/N ratio, the differentiated waveform current thereof flows continuously as shown in FIG. 3c and the mean current value thereof is large. In this case, a power loss in the output amplifier 14 which uses the class-B push-pull type amplifier is very large, and the components of the amplifier must be those for high power. Furthermore, when the contour of the image is compensated by the signal shown in FIG. 3c, the image is generally glittering and the quality of the image is degraded rather than the attainment of the contour compensation effect.

It is an object of the present invention to provide a contour compensation system by a scanning velocity modulation, which requires a low power and attains a high efficiency. Basically, it additionally includes, as a feedback circuit, a gain control unit having a means for detecting a mean current dissipated in an output amplifier and a means for controlling a gain of a preamplifier located in a preceeding stage to the output amplifier, so that the increase of power dissipation at the otuput amplifier when a noisy image signal is received is suppressed. Further, the preceding stage amplifier is provided with a saturation characteristic so that the contour compensation effect is enhanced for a small amplitude signal while the over compensation of contour is eliminated for a large amplitude signal. The combination of the saturation characteristic and the gain control further enhances the effect of suppression of power dissipation.

The present invention is directed to suppress the increase of power dissipation at the output amplifier of the scanning velocity modulation circuit when a video signal having many high frequency components is received, and to improve the quality of image.

Figure 1A:
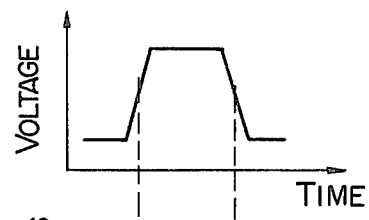
FIGS. 1a to 1d show waveforms for illustrating a principle of a contour compensation method by a scanning velocity modulation.
Figure 1B:
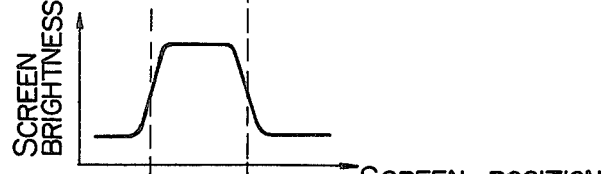
Figure 1C:
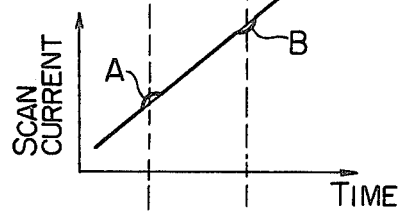
Figure 1D:
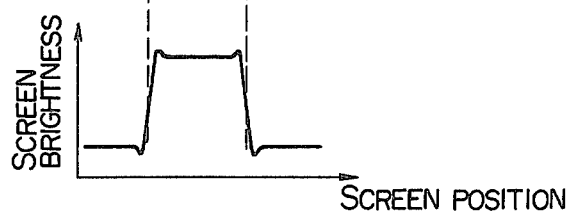
Figure 2:
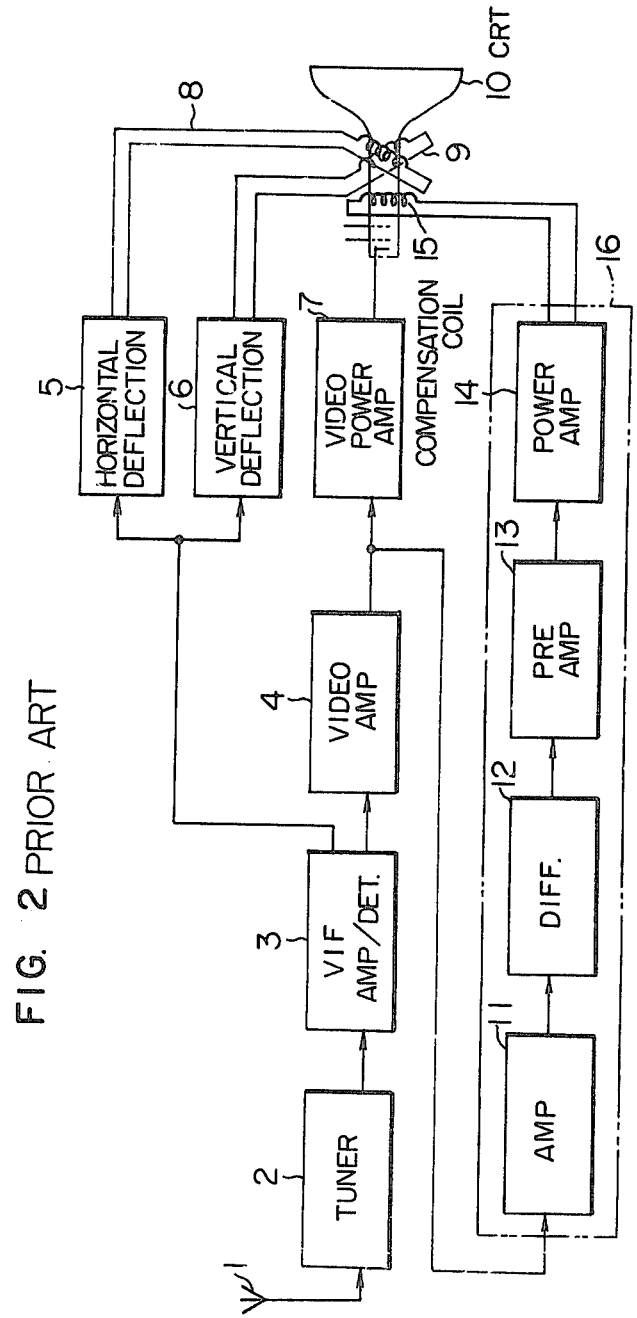
FIG. 2 shows a block diagram of a television receiver which uses the scanning velocity modulation system.
Figure 3A:
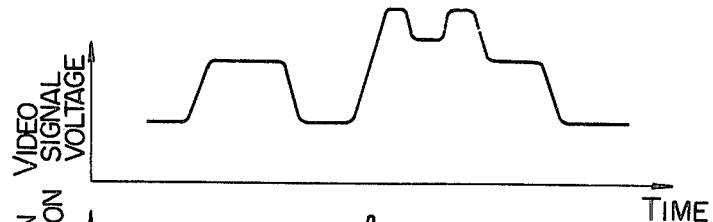
FIGS. 3a to 3c show waveforms of contour compensation signals.
Figure 3B:
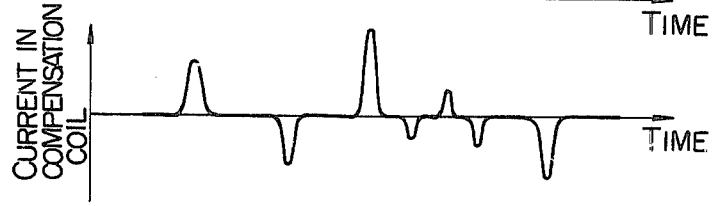
Figure 3C:
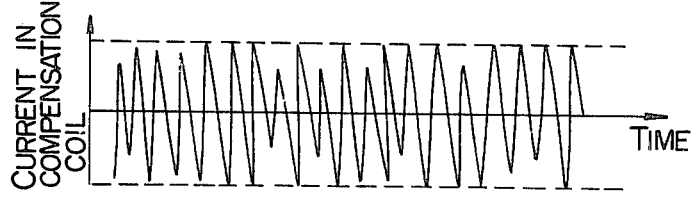
Figure 4:
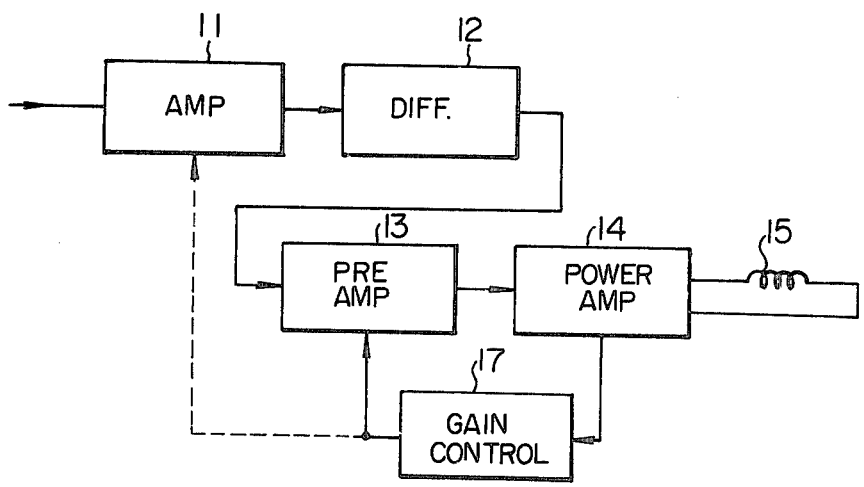
FIG. 4 shows a block diagram of a scanning velocity modulation system of the present invention.

FIG. 4 shows a basic configuration of the present invention, which comprises a velocity modulating compensation coil 15, an output amplifier 14 for driving the velocity modulating compensation coil 15, a preamplifier 13 for the output amplifier 14 provided in the path of contour compensation signal, and a gain control circuit 17 for detecting a mean amount of current dissipated in the output amplifier 14 to control a gain of the preamplifier 13.

Figure 5:
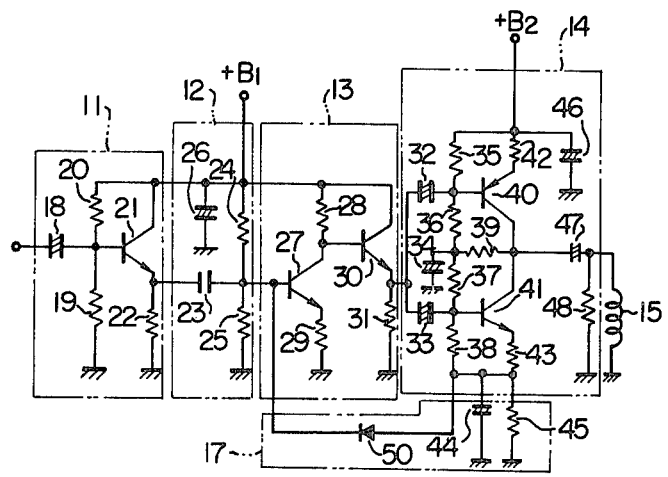
FIG. 5 shows a circuit diagram of one embodiment of the scanning velocity modulation system of the present invention.

FIG. 5 shows a circuit diagram of one embodiment of the present invention, in which numeral 18 denotes a video signal coupling input capacitor, 19, 20 denote biasing resistors for a common collector transistor 21, 22 denotes an emitter load resistor, 23 denotes a video signal differentiating capacitor, 24 and 25 denote biasing resistors for a common emitter transistor 27, 29 denotes an emitter resistor of the transistor 27, 28 denotes a collector load resistor of the transistor 27, 26 denotes a power supply filtering capacitor, 30 denotes a common collector transistor, 31 denotes an emitter load resistor of the transistor 30, 32 and 33 denote coupling capacitors to the output amplifier, 34 denotes a bias voltage filtering capacitor, 35, 36, 37, 38 and 39 denote biasing resistors of output transistors 40 and 41, 42 and 43 denote emitter resistors of the output transistors 40 and 41, 45 denotes a resistor for detecting current dissipated in the output amplifier, 44 denotes a ripple voltage filtering capacitor connected in parallel with the resistor 45, 46 denotes a power supply filtering capacitor, 15 denotes a velocity modulating compensation coil, 47 denotes a coupling capacitor for connecting the transistors 40 and 41 to the compensation coil 15, 48 denotes a damping resistor connected in parallel with the compensation coil 15, 50 denotes a gain controlling diode connected between the resistor 45 and the base of the transistor 27.

The operation of the circuit is explained. A video signal applied through the coupling capacitor 18 is current-amplified by the transistor 21, and then differentiated by the differentiation capacitor 23 and applied to the base of the transistor 27. This signal is voltage-amplified by the transistor 27 and current-amplified by the transistor 30 and taken out of the emitter thereof. The differentiated and amplified video signal is then applied to the bases of the output transistors 40 and 41 through the coupling capacitors 32 and 33. The output transistors 40 and 41 are biased to be operated at class-B and operate complementarily. Accordingly, the contour compensation current which is the differentiated and amplified video signal flows in the compensation coil 15 which is A.C.-connected to the collectors of the output transistors 40 and 41. It is advantageous that the output circuit is class-B pushpull circuit in order to enhance the power efficiency of the output circuit.

In the circuit shown in FIG. 5, the mean current dissipated in the class-B push-pull output circuit is detected by the detecting resistor 45 and the capacitor 44 such that when the potential at the detecting node increases, the gain controlling diode 50 is rendered conductive to ground the base of the amplifier transistor 27 AC-wise to attenuate the input signal to the output stage.

In this circuit arrangement, the diode 50 is non-conductive when usual broadcasting video signal is received, but it is rendered conductive only when the mean dissipation current in the output amplifier 14 increases by the reception of a signal having many high frequency components such as noisy signal or a low S/N ratio signal. When the diode 50 conducts, it clips the signal at a predetermined level to suppress the increase of power dissipation in the output amplifier 14.

Figure 6:
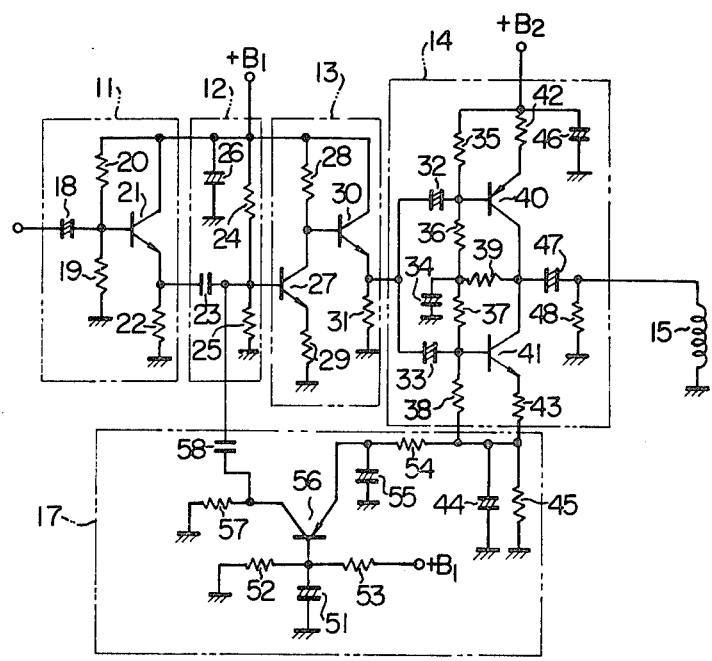
FIG. 6 shows a circuit diagram of another embodiment of the scanning velocity modulation system of the present invention.

FIG. 6 shows an embodiment which utilizes an active element for the gain control. The like numerals to those of FIG. 5 show like parts. In FIG. 6, a resistor 54 and a capacitor 55 constitute a filtering circuit, numeral 56 denotes an impedance adjusting transistor, 57 denotes a collector resistor of the transistor 56, 58 denotes a gain controlling coupling capacitor, 52 and 53 denote bias resistors and 51 denotes a filtering capacitor. The operation of the gain control circuit 17 is now explained. When a power supply current in the output amplifier 14 increases, a voltage across the output circuit dissipation current detecting resistor 45 increases and the emitter potential of the impedance adjusting transistor 56 rises. As a result, the impedance adjusting transistor 56 approaches to its conduction state and the output impedance at the collector is reduced. Consequently, the base input signal to the amplifier transistor 27 is lowered through the gain controlling coupling capacitor 58 so that the compensation current to the compensation coil 15 is reduced to reduce the current dissipated in the output amplifier 14.

When the active element is used in the gain control circuit 17, the range of control is wider than the circuit of FIG. 5. Accordingly, not only the power is suppressed when the noisy signal is received, the gain can be controlled depending on the amount of compensation current components included in the signal so that the power efficiency is further increased. While the transistor is used as the active element in the embodiment of FIG. 6, it is apparent that a similar effect is obtainable with an FET.

As described hereinabove, by detecting the mean dissipation current in the output stage of the velocity modulation circuit having the class-B push-pull output amplifier, for attenuating the input to the preceding stage amplifier, the power dissipation can be suppressed when the noisy signal or low S/N ratio signal is received, by the simple circuit configuration without reducing the amount of velocity modulation when normal broadcasting signal is received. At the same time, the glitter of the image is reduced and the quality of the image is improved.

Furthermore, since the detecting signal is applied to the preceding stage amplifier so that the output amplifier can be fully controlled by a small change of the detecting voltage, the detecting voltage across the detecting resistor 45 may be sufficiently small relative to the power supply voltage of the output amplifier, that is, the power dissipation in the detecting resistor 45 may be small enough to be negligible.

While the compensation coil 15 is used as the electron beam deflection component for compensating the contour in the above explanation, it is apparent that the same effect is obtainable by replacing the compensation coil 15 with a static deflection plate in the circuits of FIGS. 5 and 6.

A relation between the input voltage and the compensation coil current in the circuit arrangement described above is generally linear as shown in FIG. 8a. In case of a characteristic shown by a straight line p in FIG. 8a, it is possible to fully compensate for small amplitude signal for normal video signal but an over compensation may occur for a large amplitude signal. Particularly when an alphanumeric character signal and/or a graphic pattern signal is received, glittering or geometrical distortion will occur. In case of a characteristic as shown by a straight line 8 in FIG. 8a, the compensation for the small amplitude signal is not sufficient.

Figure 7:
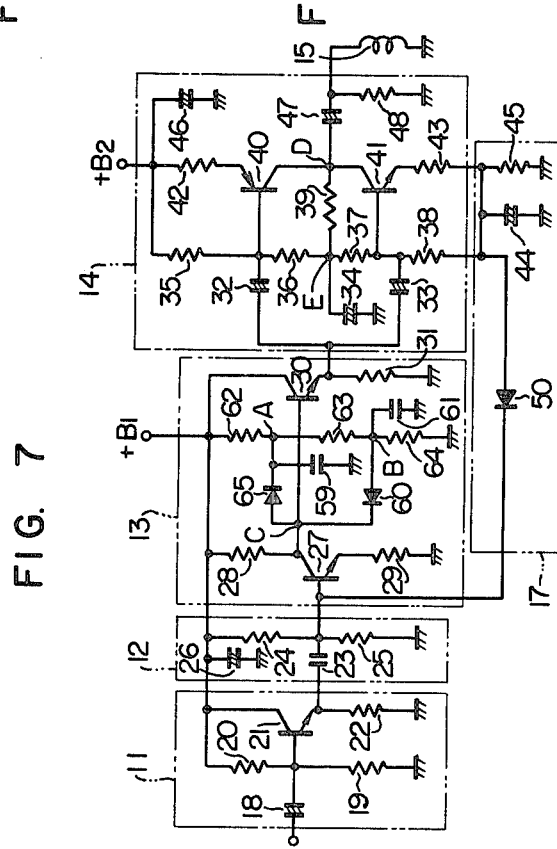
FIG. 7 shows a circuit diagram of another embodiment of the scanning velocity modulation system of the present invention.

It is, therefore, a further object of the present invention to provide a system which overcomes the difficulties encountered in the above embodiment. FIG. 7 shows one embodiment thereof. The like numerals to those in FIG. 6 show the like parts. The characteristic feature of the circuit of FIG. 7 resides in that the D.C. voltage $+B_1$ is divided by resistors 62, 63 and 64, the dividing nodes A and B are grounded A.C.-wise through capacitors 59 and 61, and diodes 65 and 60 are connected to the dividing nodes A and B with the other ends of the diodes 65 and 60 being connected to the collector of the transistor 27.

With this arrangement, the amplitude of the A.C. output voltage at the point C at the collector of the transistor 27 is suppressed to the voltage between the nodes A and B, so that the input-output characteristic in this stage shows a saturation characteristic. By virtue of this saturation characteristic, the problem of overcompensation when a large amplitude signal such as white character signal is received and the geometrical distortion of image can be resolved while attaining sufficient compensation for small amplitude signal so that the effect of compensation for the normal broadcasting signal is enhanced. Furthermore, since the large amplitude signal is automatically suppressed by the saturation characteristic, the amount of current dissipated in the output amplifier 14 has more or less saturation characteristic. Accordingly, the amount of suppression of gain by the feedback from the output amplifier described above can be reduced. In other words, an input-output characteristic p' shown in FIG. 8b changes to a characteristic q' shown in FIG. 8b by the action of gain control by the feedback, but even in this case the input-output characteristic for small amplitude signal has a higher gain than the input-output characteristic q shown in FIG. 8a.

As described above, according to the present invention, the effect of compensation when the normal broadcasting signal is received can be enhanced with a low power without causing the distortion of image by overcompensation.

Figures 8A, 8B, 8C:
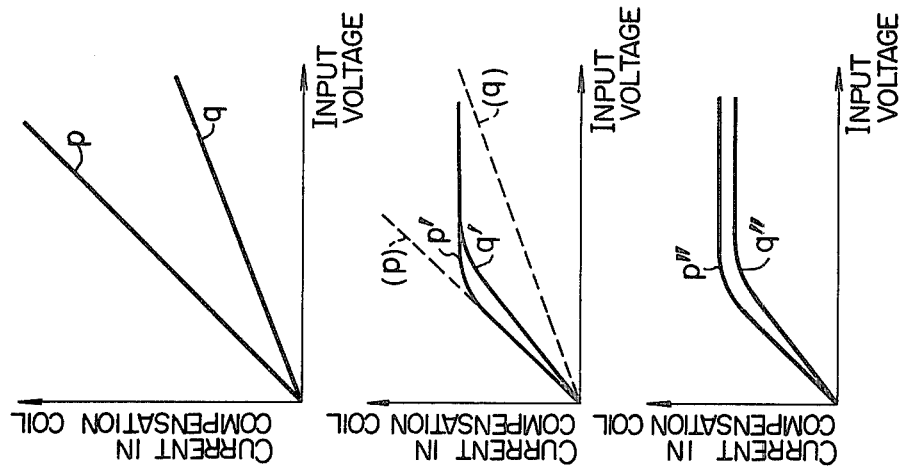
FIGS. 8a to 8c show input-output characteristics of the scanning velocity modulation system.

When such a saturation characteristic is imparted to a stage preceding to the preamplifier 13, that is, to a stage preceding to the gain control stage, the input-output characteristic changes from p'' to q'' as shown in FIG. 8c by the gain control, but a substantially same effect is obtainable.

Figure 9:
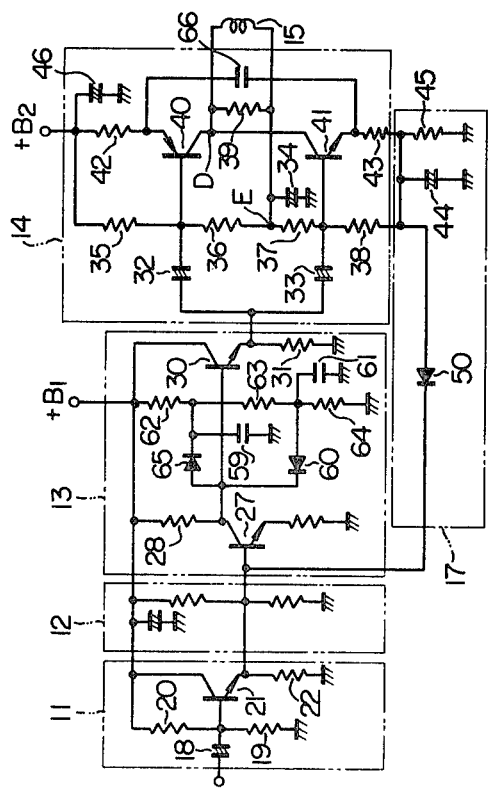
FIG. 9 shows a circuit diagram of another embodiment of the scanning velocity modulation system of the present invention.

The output amplifier 14 will be described in further detail. In FIG. 7, the differentiated video signal is applied to the bases of the output transistors 40 and 41 through the coupling capacitors 32 and 33. The output transistors 40 and 41 are biased by the bias resistors 35, 36, 37 and 38 to be operated at class-B so that they alternately supply half waves to the velocity modulating compensation coil 15. The bias potentials at the collector node D of the output transistors should be equal to approximately one half of the power supply voltage $+B_2$ in order to effectively utilize the power supply voltage $+B_2$. To this end, the resistors 36 and 37 have the same resistance and the resistors 35 and 38 have the same resistance so that the potential at point E is equal to one half of $+B_2$, which potential is coupled to the point D through a resistor 39. The resistance of the resistor 39 must be sufficiently higher than the impedance of the velocity modulating compensation coil 15 because, if the resistance of the resistor 39 is low, the current which flows into the velocity modulating compensation coil 15 to modulate the electron beam scanning velocity will also flow into the resistor 39 and wasted thereby. On the other hand, when the resistance of the resistor 39 is high, the mean potential at the point D apts to be changed by the signal. FIG. 9 shows a circuit which eliminates the above problem. In order to eliminate the instability of the bias potential at the output amplifier, the velocity modulating compensation coil 15 is connected between the points D and E as shown in FIG. 9 so that the compensation coil 15 also functions as a choke coil for the bias circuit. With this arrangement, a biasing D.C. current flows into the compensation coil but no practical problem occurs because this current is usually sufficiently smaller than the velocity modulating output current. In this manner, the bias potential can be highly stabilized, the power supply voltage is effectively utilized, and the number of parts required can be reduced so that the cost can be reduced.

It is necessary to increase the current supplied to the velocity modulating compensation coil 15 in order to create a sufficiently large magnetic field to modulate the electron beam scanning velocity. To this end, it is necessary to apply a relatively large amplitude signal to the bases of the output transistors 40 and 41. This will be described in connection with FIG. 10.

Figure 10A:
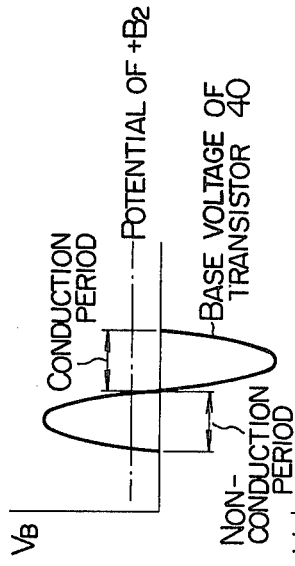
FIGS. 10a to 10c show voltage waveforms of a transistor used in the output amplifier of the scanning velocity modulation system.
Figure 10B:
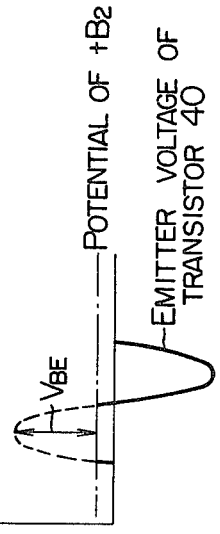
Figure 10C:
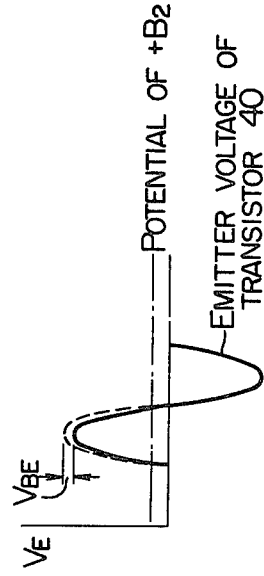

FIG. 10a shows a base voltage of the output transistor 40. Since the output amplifier 14 is operated at class-B in the illustrated embodiment, the emitter voltage of the output transistor 40 changes as shown in FIG. 10b. As seen from FIGS. 10a and 10b, the backward voltage $V_{BE}$ is applied between the base and the emitter of the transistor 40 during the cutoff period thereof. This voltage $V_{BE}$ reaches up to 10 volts when the input signal voltage is large and it may exceeds the base-emitter backward breakdown voltage of the output transistor and break the transistor. In order to avoid the breakdown, a diode may be inserted in series with the base or emitter of the output transistor to supplement the backward breakdown voltage. However, the diode to be inserted must be a switching diode having a high frequency characteristic (3–4 MHz), which is expensive. According to the present invention, as shown in FIG. 9, the emitters of the output transistors 40 and 41 are interconnected by a capacitor 66. Since one of the output transistor is conductive when the other output transistor is non-conductive, the emitter voltage of the output transistor 40 shown in FIG. 10b changes as shown in FIG. 10c. Thus, the emitter voltage $V_E$ changes in the same waveform as the base voltage $V_B$, and hence the base-emitter backward voltage is reduced so that the output transistor is not broken.

What is claimed is:

1. A scanning velocity modulation system comprising a scanning velocity modulating electron beam deflector, a power amplifier for driving said deflector, a preamplifier inserted in a compensation signal path at a stage preceding to said power amplifier, and a gain control circuit for detecting a mean current dissipated in said power amplifier to control a gain of said preamplifier in response to the detected signal.

2. A scanning velocity modulation system according to claim 1 wherein said gain control circuit includes a diode which is rendered conductive when the mean current dissipated in said power amplifier increases to reduce the gain of said preamplifier.

3. A scanning velocity modulation system according to claim 1 wherein said gain control circuit includes an active element an impedance of which is changed when the means current dissipated in said power amplifier increases to reduce the gain of said preamplifier.

4. A scanning velocity modulation system according to claim 1 wherein said preamplifier has a saturation characteristic.

5. A scanning velocity modulation system according to claim 1 wherein said scanning velocity modulating electron beam deflector includes a velocity modulating compensation coil, said power amplifier including a pair of complementary transistors, the collectors of said transistors being connected together and connected in series with a power supply, first, second, third and fourth resistors being connected in series between the terminals of said power supply, said velocity modulating compensation coil being connected between the junction of said second and third resistors and the junction of said collectors, a base of one of said complementary transistors being connected to the junction of said first and second resistors while a base of the other transistor being connected to the junction of said third and fourth resistors, the junction of said second and third resistors being grounded a A.C-wise through a capacitor, the bases of said complementary transistors being adapted to receive in-phase input signals.

6. A scanning velocity modulation system according to claim 1 wherein said power amplifier includes a pair of complementary transistors, collectors of said transistors being connected together to produce an output therefrom, emitters of said transistors being interconnected via a capacitor.

7. A scanning velocity modulation system comprising a scanning velocity modulating electron beam deflector including a velocity modulating compensation coil, a power amplifier including a pair of complementary transistors having collectors connected together, emitters interconnected via a capacitor and bases connected to biasing resistors, the junction of said resistors being grounded A.C.-wise by a capacitor, said velocity modulating compensation coil being connected between the junction of said biasing resistors and the capacitor and the junction of said collectors, the bases of said complementary transistors being adapted to receive in-phase input signals, a preamplifier having a saturation characteristic by a diode clip and inserted in a stage preceding to said power amplifier, and a gain control circuit having a diode connected between the junction of resistors connected in series with the emitter of one of the transistors of said power amplifier and an input node of said preamplifier.

* * * * *